No. 737,950. PATENTED SEPT. 1, 1903.
H. McCANN.
BOX PLATE AND ATTACHMENT THEREFOR.
APPLICATION FILED APR. 15, 1903.
NO MODEL. 2 SHEETS—SHEET 1.
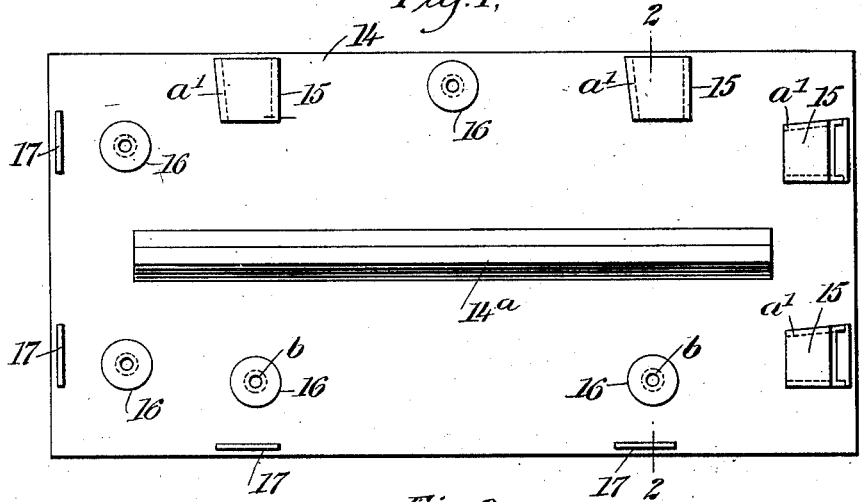
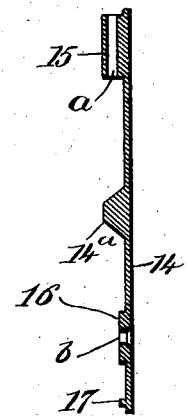
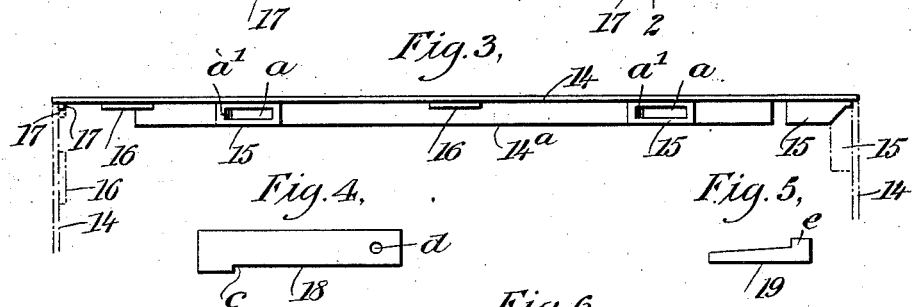
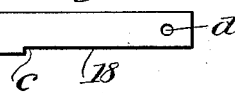
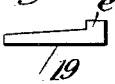
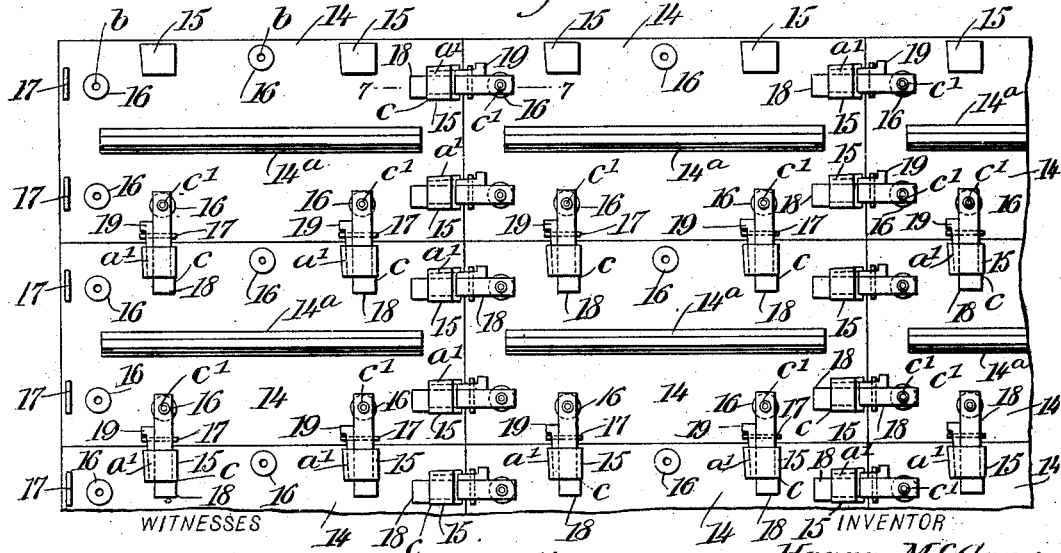
WITNESSES
Edward Thorpe
Wm L Patton
INVENTOR
Harry McCann
BY
ATTORNEYS.

No. 737,950. PATENTED SEPT. 1, 1903.
H. McCANN.
BOX PLATE AND ATTACHMENT THEREFOR.
APPLICATION FILED APR. 15, 1903.
NO MODEL. 2 SHEETS—SHEET 2.
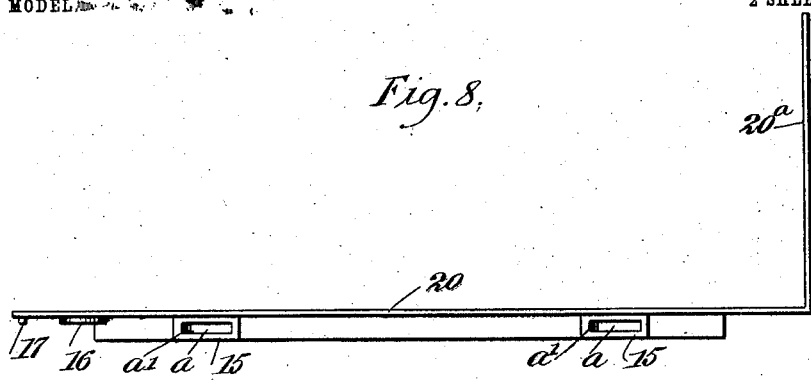
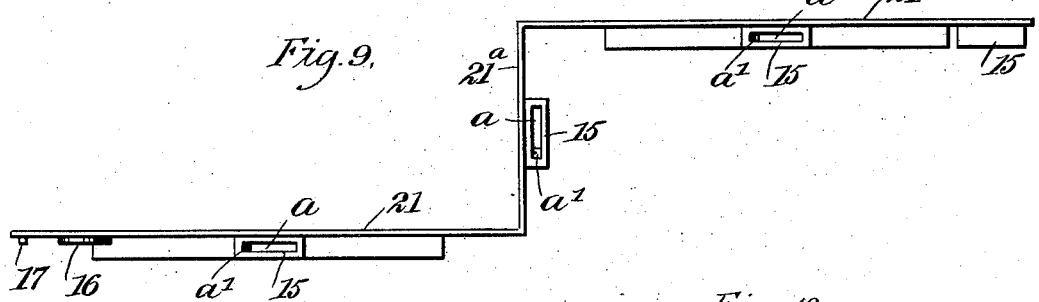
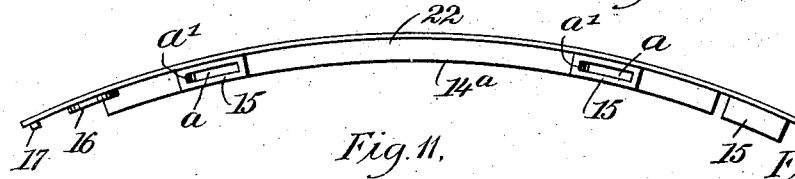
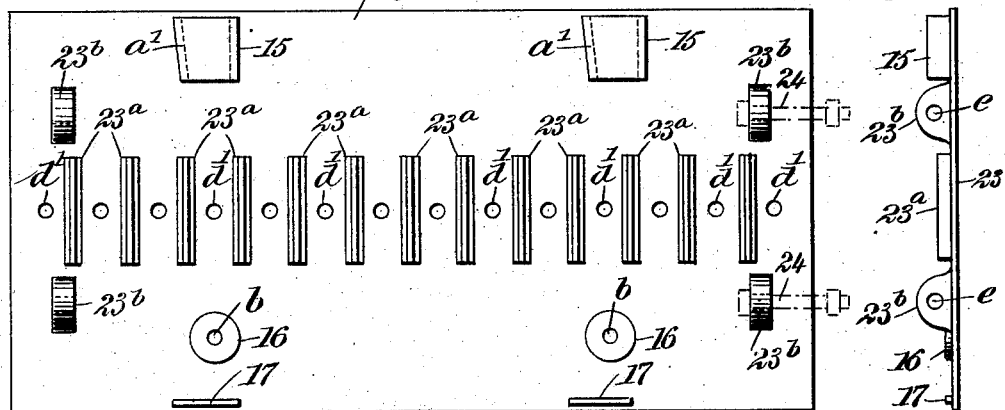
WITNESSES: Edward Thorpe. Wm. P. Patton.
INVENTOR Harry McCann BY Munn ATTORNEYS.

No. 737,950. Patented September 1, 1903.

UNITED STATES PATENT OFFICE.

HARRY McCANN, OF HAMILTON, CANADA.

BOX-PLATE AND ATTACHMENT THEREFOR.

SPECIFICATION forming part of Letters Patent No. 737,950, dated September 1, 1903.

Application filed April 15, 1903. Serial No. 152,695. (No model.)

*To all whom it may concern:*

Be it known that I, HARRY McCANN, a subject of the King of Great Britain, and a resident of Hamilton, in the Province of Ontario and Dominion of Canada, have invented new and useful Improvements in Box-Plates and Attachments Therefor, of which the following is a full, clear, and exact description.

This invention relates to means for shaping and supporting plastic material, such as mortar of cement or hot concrete, in the erection of building or other walls from such material, and has for its object to provide novel box-plates and novel means for assembling and holding such plates in box form for reception of the plastic material and retaining the same in proper shape until it becomes rigid, thus producing building or other walls of any preselected design.

This invention consists, essentially, in the construction and combination of parts, as is hereinafter described, and defined in the appended claims.

Reference is to be had to the accompanying drawings, forming a part of this specification, in which similar characters of reference indicate corresponding parts in all the figures.

Figure 1 is an outer side view of a box-plate embodying features of the invention. Fig. 2 is a transverse sectional view substantially on the line 2 2 in Fig. 1. Fig. 3 is an edge view of the plate shown in Figs. 1 and 2. Fig. 4 is an enlarged side view of a latch-bar employed. Fig. 5 is a side view of a locking-key employed. Fig. 6 is a front view of a plurality of box-plates held marginally connected by my improved means. Fig. 7 is a longitudinal sectional view substantially on the line 7 7 in Fig. 6. Fig. 8 is an edge view of an angular box-plate employed in forming jambs and turning corners in building construction. Fig. 9 is an edge view of an approximately L-shaped box-plate used in forming offsets in wall construction. Fig. 10 is an edge view of a bent plate adapted to form arches over door or window openings in wall construction. Fig. 11 is a front face view of a flat box-plate having additional means for connecting spaced parallel plates together and holding transverse box-plates at the ends of side box-plates. Fig. 12 is an end view of the box-plate shown in Fig. 11, and Fig. 13 is a plan view showing the upper edges of two spaced parallel box-plates and an end plate secured thereto.

In the drawings that illustrate the construction and application of the invention, 14 represents one of a plurality of flat plates that are detachably connected at their meeting edges to afford a metal side wall, which, with a similar side wall that is held spaced therefrom, affords a box-like receptacle wherein plastic cement, grout, or hot concrete is introduced and held to form a wall of such material, said plates being detached from each other when the plastic material "sets" or cools sufficiently to become rigid, the construction of this section of a multipart box-plate wall and novel means for detachably connecting a plurality of such box-plate sections together being essentially as follows: The plate 14 is preferably cast into form from iron, having mainly parallel flat sides and a suitable thickness to afford necessary strength without excessive weight, and, as is clearly shown in Figs. 1 and 6, the box-plate 14 is oblong and rectangular; but it is to be understood that said plate may be square if this is necessary. One side of the plate 14 is rendered flat and smooth, this surface being disposed innermost to afford support for the plastic wall material, the means for holding a desired number of these plates connected together edgewise being formed upon and attached to the opposite surface or outer side of the box-plate. As it is desirable that the several plates 14, which constitute a multipart wall, be cast as thin as is admissible, it is found of advantage to reinforce the box-plate whether it is large or small by casting a stiffening-rib $14^a$ thereon, said rib being usually located at the transverse center of the plate and extending longitudinally upon the outer surface, terminating near each end of the plate, as is shown in Figs. 1 and 6.

The preferred means for detachably securing the plates 14 together at their side edges and transverse defining edges on their ends consists of the following details: Upon the outer side of each box-plate 14 two integral loops 15 are formed or secured, these loops being spaced apart, so as to locate each one a short distance from a respective end of the box-plate. The similar loops 15 are located near one side edge of the box-plate 14 and are preferably cast integral therewith and are, in effect, staples that each define a rectangular channel $a$, which extends transversely of the box-plate and may have one side wall $a'$ inclined toward the opposite side wall from the outer end of the looped formation inwardly, as indicated in Fig. 1 by dotted lines. Nearly opposite each of the rectangular loops 15 a flat boss 16 is outwardly projected from the outer side of the box-plate 14, and at the center of this preferably circular boss a perforation $b$ is formed through the boss and body of the box-plate, these holes in the pair of spaced bosses 16 being countersunk from the innermost side of the box-plate to accommodate a correspondingly-contoured bolt-head, the countersunk formations being shown by dotted lines in Fig. 1. Near each of the bosses 16 a flat rib 17 is raised from the box-plate 14, near a side edge of the same, which is adjacent to said bosses, and the ribs and bosses are of an equal height. A latch-bar 18, having a hook projection at one side edge and one end thereof, affording a locking-shoulder $c$, is held to rock on each boss 16 by a pivot-bolt $c'$, that engages the countersunk hole in the boss, and is also engaged within a perforation $d$, formed in the latch-bar near its end opposite from that whereon the lateral hook is formed. Each latch-bar 18 is so positioned that it may be slidably introduced within a loop 15, that is on another box-plate 14, which is to have a side edge thereon engaged with the side edge of the box-plate from which the latch-bars 18 project, said latch-bar seating upon a respective rib 17. Upon full insertion of the latch-bars 18 within the opposite loops 15, as explained, said latch-bars should be rocked laterally and cause the hook-shoulder $c$ on each latch-bar to lock upon the inner end of the straight side of the channel in the loop formation wherein the bar 18 has been inserted. There is sufficient space between the opposite side edge of a respective latch-bar and the inner sloped side $a'$ of the channel $a$ in an engaged loop 15 to permit the insertion of a locking-key 19 therein. Each key 19 is tapered somewhat from a lateral offset $e$ thereon toward the opposite end, as is clearly shown in Fig. 5, and it will be seen in Fig. 6 that a plurality of the box-plates 14 may be held detachably connected at their meeting side edges by the loops 15, latch-bars 18, and keys 19, so that a multipart box-plate or wall of any desired height may thus be provided. At the ends of the box-plates 14 means for detachably connecting the abutting ends of a plurality of such box-plates similar to that already described are employed to join together the side edges of said plates is preferably employed, there being one or more of such securing devices provided for the ends of the box-plates which are to be connected together.

As shown in Fig. 6, two spaced loops 15 are furnished for each box-plate 14, these being positioned near the transverse edge on one end of the plate, said loops having rectangular channels $a$ therein and otherwise constructed as hereinbefore described. A latch-bar 18 is secured on a boss 16, so as to project from the end of the next box-plate 14 in sequence with the one having the loops 15 at its end, and these latch-bars slide into said loops and are interlocked therewith by an engagement of their shoulders $c$ with the end of a respective side of an engaged loop formation, whereon these shoulders are held by insertion of the keys 19, as before explained.

As indicated in Figs. 6 and 7, the outer ends of the loops 15 are beveled, preferably at an angle of forty-five degrees, so that the ends of two box-plates may be joined together at a right angle by engagement of the beveled ends of the loop formations, as indicated in Fig. 3 by full and dotted lines, this angular junction of box-plates being advantageous when a plurality of said box-plates are employed to form a multipart wall that affords a smooth surface for the formation of the inner side of a cement or concrete wall at a corner thereof.

It will be seen in Fig. 3 at the left that two of the box-plates may be joined at a right angle by an engagement of their ends having the ribs 17 thereon, said ribs on the box-plates abutting upon each other, as shown by full and dotted lines in said figure.

In Fig. 8 a box-plate 20 is shown, having a wing 20$^a$, extended at a right angle from one end of said box-plate, this form for a plurality of such plates being employed to form a jamb-wall at a door or window, and, as represented, loop formations 15 and latch-bars 18 are provided for detachably securing the side edges and ends of such box-plates together to produce a multipart wall for support of plastic building material.

In Fig. 9 another special form for box-plates is shown, such plates in suitable number being advantageously employed for the shaping and support of plastic material to produce an offset, such as a pilaster, on the exterior of a cement or concrete upright wall for a building or other structure, such plates having two longitudinal members 21, held spaced apart a suitable distance in parallel planes by a transverse member 21$^a$, that joins opposite ends of the longitudinal members together at right angles. As shown, provision for holding the side edges and ends of any desired number of the angular plates 21, similar to the devices employed for holding the previously-described box-plates 14, connected in sequence and at the side edges thereof, are preferably used, and like means for stiffening said box-plates 21 are employed. A box-plate 22 is shown in Fig. 10 that is curved so as to serve as a support for material at the top of a door or window opening in a building-wall that is formed of plastic material, the curvature of the box-plate being of any desired degree to produce a suitably-arched top wall for the opening in the building-wall, and to enable the transverse dimension of the curved box-plate 22 to be increased to any necessary width a suitable number of loops 15 for reception of locking latch bars and keys are provided, as hereinbefore described, and in case the arched box-plate 22 is to be formed in sections joined together endwise the same means for detachably holding such box-plate sections connected may be employed. Furthermore, the arched box-plates are each preferably reinforced by a strengthening-rib 14$^a$.

As it is essential in some constructions for buildings formed of plastic material that cross tie-bolts be employed to hold the inner and outer multipart box-plate walls spaced apart and as the spaces between said transverse bolts may vary, it has been found advantageous to provide in sufficient number a box-plate specially well adapted for such service, an example of one construction for such box-plates being shown in Figs. 11, 12, and 13. The box-plate 23 is flat, of rectangular contour, of any preferred dimensions, and along one side edge is furnished with two or more loop formations 15, similar to those shown on the box-plate 14, these being adapted to receive latch-bars, such as have been hereinbefore fully described, and on the box-plate 23, at suitable points near the opposite side edge, flat bosses 16 are projected therefrom to accommodate latch-bars (not shown) that are when pivoted thereon adapted to interlock within loops 15 on an adjacent box-plate of the same construction, or, if desired, one formed in detail, as shown in either of the Figs. 8, 9, and 10.

A series of similar spaced perforations $d'$ is formed in the box-plate 23 at or near its transverse center, and this row of holes may extend nearly from one end of the plate to the other end of the same. Between the perforations $d'$ a plurality of stiffening-ribs 23$^a$ are formed transversely on the same side of the plate 23, with the loop formations 15 thereon, said ribs having sufficient length to give the plate necessary rigidity. Near each end of the box-plate 23 two spaced lugs 23$^b$ are formed thereon, preferably adjacent to respective corners of the plate, said lugs each having a central transverse perforation $e$, wherein clamping-bolts 24 may be inserted and project therefrom over each end of the box-plate, as indicated by dotted lines in Fig. 11 and full lines in Fig. 13. There may be any number of the flat box-plates 23 provided to coact with the other box-plates that have been described, and the plates 23 will be particularly advantageous for clamping in position other flat box-plates that are to be held at a right angle between inner and outer box-plate walls to produce upright jambs at windows or doors in a building-wall and likewise detachably hold an arched box-plate 22 above the jamb-plates. To adapt the box-plates 23 for the service mentioned, they are so arranged in connection with the box-plates 14, 20, and 21 that they will project at similar ends across the space to be left for a window or door opening, so that transverse bolts 24 may be inserted through opposite holes $d'$ in the spaced inner and outer box-plate walls, of which the plates 23 are portions, an obvious adjustment of nuts on the ends of such bolts serving to bind the opposed plates 23 upon intervening jamb-plates and arched plates for the formation of a window or door opening in a building-wall to be subsequently formed in the matrix afforded by the properly-arranged box-plates.

As shown in Fig. 13, the box-plates 23 may be held spaced apart to form a jamb by a flat transverse box-plate 23, of a suitable width and length, that is clamped upon like ends of the parallel box-plates by the insertion of clamping-bolts 24 through adjacent lugs 23$^b$ and perforations $d'$, that are in the transverse box-plate, and the subsequent application of binding-nuts 24$^a$ upon threaded ends of the bolts that project through the transverse box-plate.

It will be seen from the foregoing description of box-plates employed in the formation of walls from plastic material that they are all essential to afford suitable matrices wherein the prepared material may be placed to receive proper form and be held thus until the material becomes rigid.

While I have shown and described the box-plates as arranged to meet at their opposing edges, it may be desirable in practice to arrange the box-plates so as to break joints. Therefore I do not limit myself to the exact arrangement of said plates as herein shown and described.

Having thus described my invention, I claim as new and desire to secure by Letters Patent—

1. A box-plate smooth on one side and provided on the opposite side with an integral longitudinal rib, loops at one side edge and one end, and apertured bosses and ribs at the other side edge and end of said side, shouldered latches pivoted to said bosses and adapted to engage the ribs and to enter loops on adjacent box-plates, and keys for locking the latches in the loops, as set forth.

2. A rectangular box-plate, smooth on one side, stiffened on the opposite side by an integral longitudinally-extended rib, integral loops formed on the stiffened side of the box-plate near one side edge, and near one end of said box-plate, latch-bars on the other side edge and end of the plate having the loops, and adapted to enter and interlock within similar loops on adjacent box-plates, and a key for each latch-bar, adapted to hold said latch-bar locked within a respective loop.

3. A box-plate smooth on one side and provided on the opposite side at one side edge and one end with loops, the loops at the end of the plate having their outer ends beveled, the plate being provided at its opposite side and end with ribs, as set forth.

4. A box-plate smooth on one side and provided on the opposite side at one side edge and one end with loops, pivoted shouldered latches at the other side edge and end of the plate, and adapted to enter the loops of an adjacent plate, and keys for locking the latches in the loops, as set forth.

5. A box-plate smooth on one side and provided on the opposite side at one side edge and one end with loops, and at the other side edge and end with apertured bosses and ribs, and latches pivoted to the bosses and adapted to engage the ribs and to enter the loops of an adjacent plate, as set forth.

In testimony whereof I have signed my name to this specification in the presence of two subscribing witnesses.

HARRY McCANN.

Witnesses:
LINDLEY HARPER,
GORDON S. WRIGHT.